(12) United States Patent
Jayasekara et al.

(10) Patent No.: US 7,848,061 B2
(45) Date of Patent: Dec. 7, 2010

(54) CURRENT PERPENDICULAR TO PLANE (CPP) MAGNETORESISTIVE SENSOR WITH BACK FLUX GUIDE

(75) Inventors: Wipul Jayasekara, San Jose, CA (US); Vladimir Nikitin, Campbell, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 969 days.

(21) Appl. No.: 11/375,875

(22) Filed: Mar. 14, 2006

(65) Prior Publication Data

US 2007/0217080 A1    Sep. 20, 2007

(51) Int. Cl.
   *G11B 5/127*    (2006.01)
(52) U.S. Cl. .................................................... 360/319
(58) Field of Classification Search .................. None
   See application file for complete search history.

(56) References Cited

U.S. PATENT DOCUMENTS

| | | | |
|---|---|---|---|
| 5,898,547 A | 4/1999 | Fontana, Jr. et al. ......... 360/113 |
| 5,901,018 A | 5/1999 | Fontana, Jr. et al. ......... 360/104 |
| 6,223,420 B1 | 5/2001 | Lee et al. .................. 29/603.14 |
| 6,344,954 B1 | 2/2002 | Redon et al. ............. 360/324.2 |
| 6,381,107 B1 | 4/2002 | Redon et al. ............. 360/324.2 |
| 6,538,856 B1 * | 3/2003 | Gill ............................ 360/319 |
| 7,522,391 B2 * | 4/2009 | Freitag et al. .......... 360/324.12 |
| 2001/0004306 A1 | 6/2001 | Lee et al. ..................... 360/244 |
| 2007/0064350 A1 * | 3/2007 | Gill ........................ 360/324.2 |
| 2007/0081279 A1 * | 4/2007 | Hong et al. .............. 360/324.1 |
| 2007/0086122 A1 * | 4/2007 | Freitag et al. ............ 360/324.2 |
| 2007/0133132 A1 * | 6/2007 | Carey et al. ............ 360/324.11 |
| 2007/0217088 A1 * | 9/2007 | Freitag et al. .......... 360/324.12 |

\* cited by examiner

*Primary Examiner*—Mark Blouin
(74) *Attorney, Agent, or Firm*—Zilka-Kotab, PC

(57) ABSTRACT

A current perpendicular to plane (CPP) magnetoresistive sensor having a free layer that is magnetically coupled with a magnetic shield, thereby providing the free layer with a large effective flux guide. Sensor performance is improved by virtually eliminating demagnetization fields at the back edge of the sensor. The free layer can be magnetically connected with the shield by a magnetic coupling layer or shunt structure that is disposed between the free layer and the shield behind the capping layer.

23 Claims, 12 Drawing Sheets

CURRENT PERPENDICULAR TO PLANE (CPP) MAGNETORESISTIVE SENSOR WITH BACK FLUX GUIDE

FIELD OF THE INVENTION

The present invention relates to magnetoresistive sensors and more particularly to a current perpendicular to plane sensor (CPP GMR or tunnel valve) having a flux guide structure for improved sensor performance.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second shield layers. In a merged magnetic head, a single ferromagnetic layer functions as the second shield layer of the read head and as the first pole piece layer of the write head. In a piggyback head the second shield layer and the first pole piece layer are separate layers.

The ever increasing demand for increased data rate and data capacity has lead a relentless push to develop magnetoresistive sensors having improved signal amplitude. Sensors that show promise in achieving higher signal amplitude are current perpendicular to plane (CPP) sensors. Such sensors conduct sense current from top to bottom, perpendicular to the planes of the sensor layers. Examples of CPP sensors include current perpendicular to plane giant magnetoresistive sensors (CPP GMR sensors), and tunnel valves. A CPP GMR sensor operates based on the spin dependent scattering of electrons through the sensor, similar to a more traditional CIP GMR sensor except that, as mentioned above, the sense current flows perpendicular to the plane of the layers. A tunnel valve sensor operates based on the spin dependent tunneling of electrons through a thin, non-magnetic, electrically insulating barrier layer.

Even with the use of CPP sensors, however, there remains an ever increasing need to increase the performance of the sensor. Therefore, there is a strong felt need for a manufacturable sensor design that can provide increased signal amplitude. Such a sensor design would preferably be implemented in a CPP sensor such as a CPP GMR or a tunnel valve.

SUMMARY OF THE INVENTION

The present invention provides a current perpendicular to plane magnetoresistive sensor that increases free layer response by reducing demagnetization fields at the back edge of the free layer. The sensor includes a free layer having capping layer formed over a portion of the free layer. Another portion of the free layer near the back edge is magnetically connected with an electrically conductive, magnetic shield.

Connection between the free layer and the magnetic shield can be achieved by a magnetic coupling layer formed behind the capping layer. The capping layer can be Ta, and can have a top and bottom surfaces that are coplanar with top and bottom surfaces of the magnetic coupling layer. The magnetic coupling layer can be NiFe, CoFe or some other magnetic material.

A magnetoresistive sensor according to an embodiment of the invention can be constructed by depositing a plurality of sensor layers including a free layer and a non-magnetic capping layer deposited over the free layer. A mask can then be formed over the sensor layers, the mask having a back edge that determines a stripe height of the sensor. A reactive ion etch (RIE) can then be performed to remove portions of the capping layer that are not protected by the mask, and leaving the free layer substantially intact. A layer of magnetic material is then deposited. An ion mill can then be performed to remove sensor materials and horizontally disposed portions of the deposited magnetic layer. Then, a non-magnetic, electrically insulating fill layer can be deposited, a CMP performed, and a shield layer deposited. The remaining magnetic material layer, forms a magnetic coupling layer at the back edge of the free layer that magnetically connects the free layer with the shield.

A CPP sensor according to the present invention advantageously couples the free layer with the shield to provide the shield with an effective flux guide, providing improved sensor performance. A CPP sensor according to the present invention can be easily manufactured using presently available manufacturing processes, with little additional cost or manufacturing complexity.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
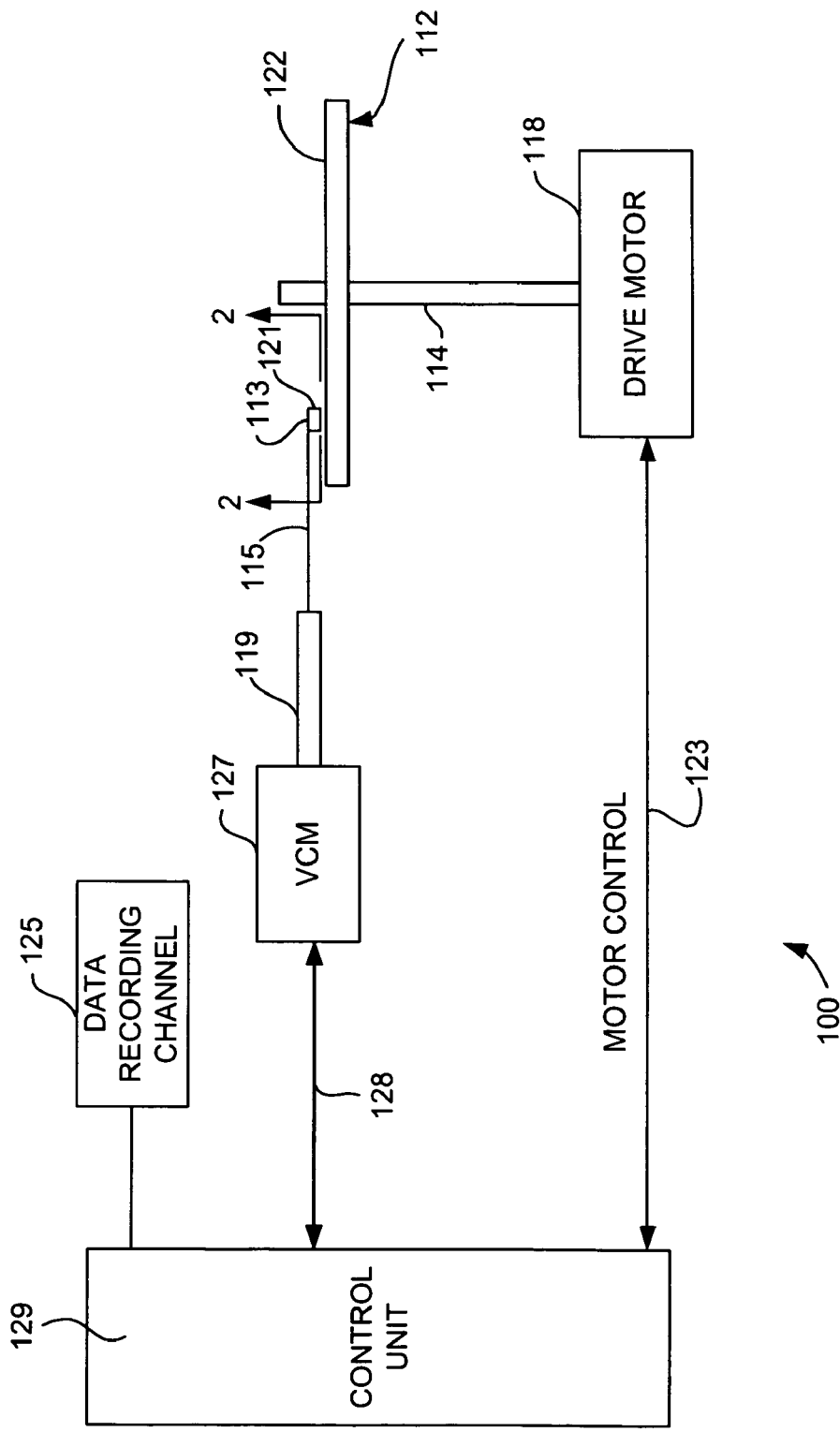
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
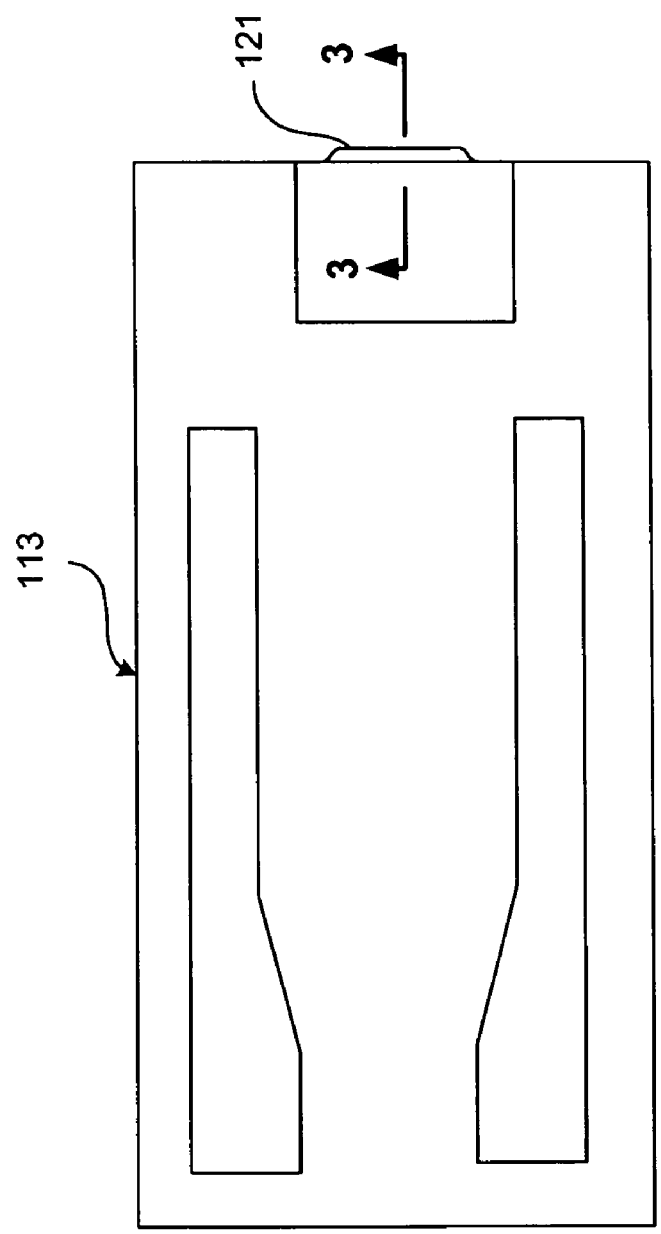
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
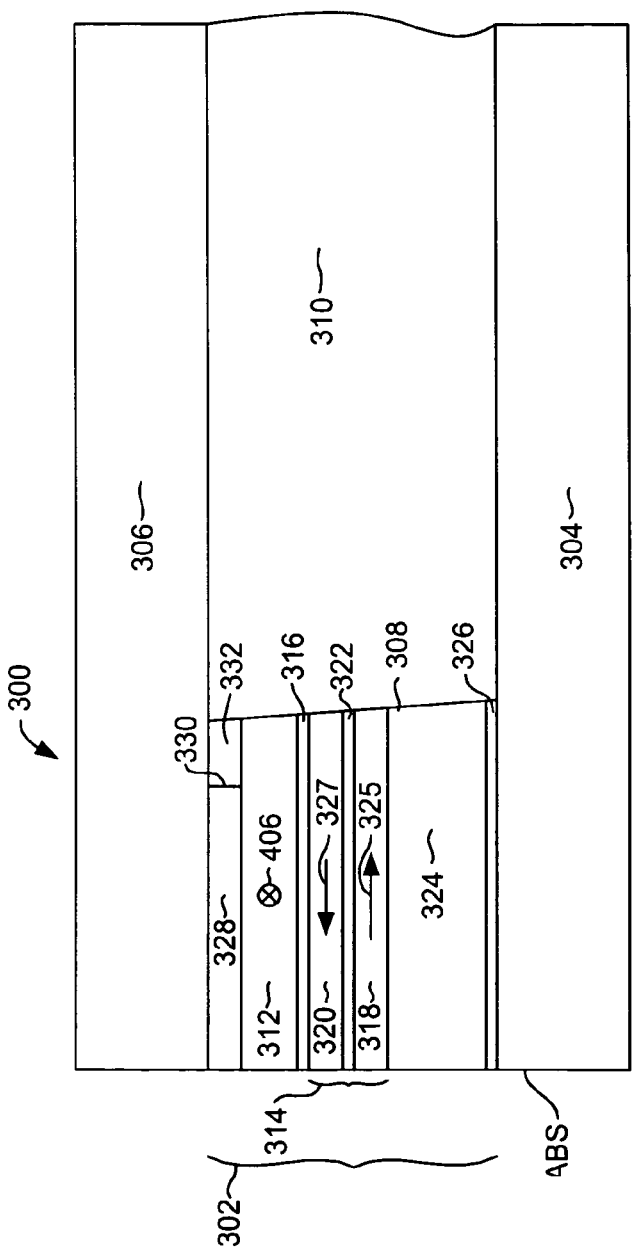
FIG. 3 is an enlarged cross sectional view taken from line 3-3 of FIG. 2.

With reference now to FIG. 3, a cross sectional view of a CPP giant magnetorsistive sensor (CPP GMR) 300 according to an embodiment of the invention is described. The sensor 300 includes a sensor stack 302 sandwiched between first and second electrically conductive lead/shields 304, 306. The lead/shields 304, 306 are constructed of an electrically conductive, magnetic material such as NiFe so that they can function as both leads (to provide a sense current to the sensor) and as magnetic shields. Although the layers 304, 306 function as both leads and shields, they will be referred to hereinafter as shields 304, 306.

The sensor stack has an air bearing surface ABS, and a back edge or stripe height 308. A non-magnetic, electrically insulating fill material 310 such as alumina ($Al_2O_3$) fills the space between the shields 304, 306 beyond the stripe height 308 of the sensor stack 302.

The sensor stack includes a magnetic free layer 312 and a pinned layer structure 314. A non-magnetic layer 316 is sandwiched between the free layer 312 and pinned layer structure 314. The non-magnetic layer 316 can be a non-magnetic, electrically conductive spacer layer constructed of, for example, Cu if the sensor 300 is embodied in a current perpendicular to plane giant magnetoresitive sensor (CPP GMR). If the sensor 300 is embodied in a tunnel valve sensor, the layer 316 can be a non-magnetic, electrically insulating barrier layer, such as MgO. Although the invention can be embodied in a CPP GMR sensor or a tunnel valve, for purposes of simplicity the invention will be described herein below as a tunnel valve having a barrier layer 316.

With continued reference to FIG. 3, the free layer 312 can be constructed of, for example Co, CoFe, NiFe, or a combination of these or other materials. The pinned layer can be of various types such as simple pinned, self pinned, etc., but is preferably embodied in an AFM pinned, AP coupled structure. Therefore, the pinned layer structure 314 may include a first magnetic layer AP 1 318, a second magnetic layer 320 and a non-magnetic antiparallel coupling layer (AP coupling layer) 322 such as Ru sandwiched between the AP1 and AP2 layers 318, 320. The AP1 and AP2 layers 318, 320 may be constructed of, for example, CoFe, or could be constructed of some other magnetic material. The AP1 layer 318 is exchange coupled with a layer of antiferromagnetic material (AFM layer) 324. This exchange coupling strongly pins the magnetization 325 of the AP1 layer 318. Antiparallel coupling between the AP1 and AP2 layers pins the magnetization 327 of the AP2 layer 320 in a desired direction perpendicular to the ABS and anti-parallel with the magnetization 325 of the AP2 layer 320.

A seed layer 326 may be provided at the bottom of the sensor stack 302 to promote a desired crystalline growth of the layers deposited over the seed layer 326. A non-magnetic capping layer 328 is provided at the top of the sensor stack 302 and can be constructed of, for example Ta. The capping layer 328 is preferably constructed of a material having a low electrical resistance in order to minimize parasitic resistance through the sensor stack 302.

With reference to FIG. 3, it can be seen that the capping layer 328 has a back edge 330 that terminates short of the back edge or stripe height 308 of the rest of the sensor stack, and terminates short of the stripe height of the free layer 312. A magnetic coupling layer 332, is provided at the back end of the sensor opposite the ABS. The magnetic, coupling layer 332 magnetically connects the back of the free layer 312 with the shield 306, thereby allowing the entire shield 306 to act as a flux guide to absorb magnetic flux from the free layer 312. This greatly increases the responsiveness of the free layer by eliminating demagnetization fields at the back edge (stripe height edge) of the free layer 312. The capping layer 328 preferably extends from the ABS toward the back edge of the free layer 312 a distance of at least ¾ of the distance from the ABS to the back edge of the free layer. As can be seen, the capping layer 328 and the magnetic coupling layer 332 have coplanar top surfaces and coplanar bottom surfaces.

Figure 4:
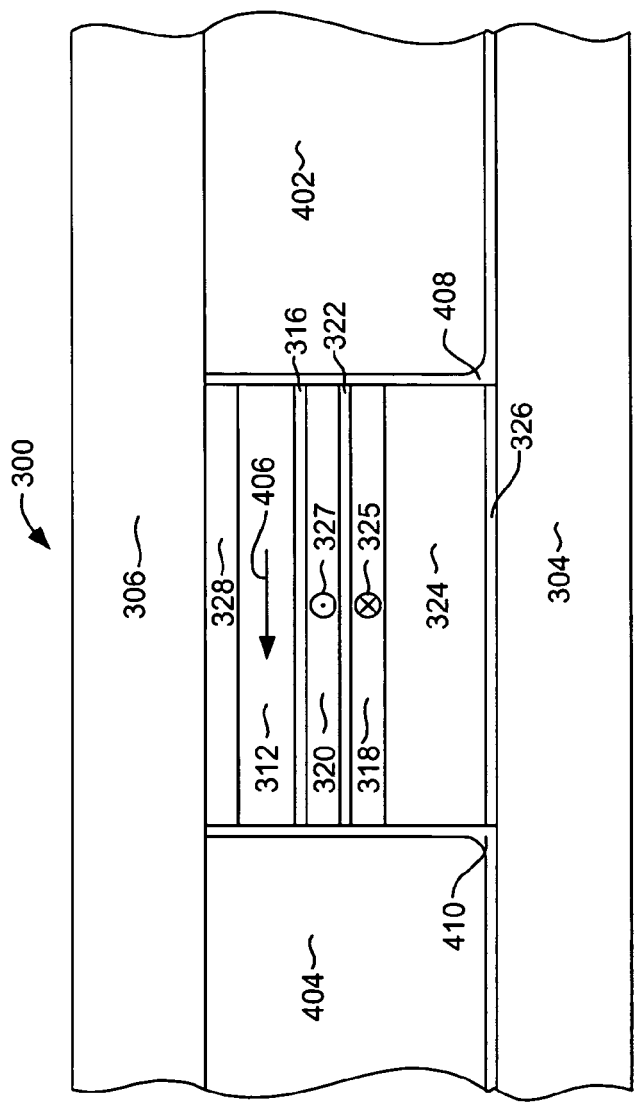
FIG. 4 is an ABS view of the sensor of FIG. 3 taken from line 4-4 of FIG. 3.

With reference now to FIG. 4, the sensor 300 may include hard bias layers 402, 404 extending from either lateral side of the sensor stack 302 to bias the magnetization 406 of the free layer in a desired direction parallel with the ABS. Thin insulation layers 408, 410 are formed at either side of the senor stack and extend over the first shield layer 304 to prevent sense current from being shunted across the hard bias layers 402, 404. The hard bias layers 402, 404 can be constructed of, for example CoPt, CoPtCr or some other magnetically hard material. The insulation layers 408, 410 can be constructed of, for example, alumina.

Figure 5:
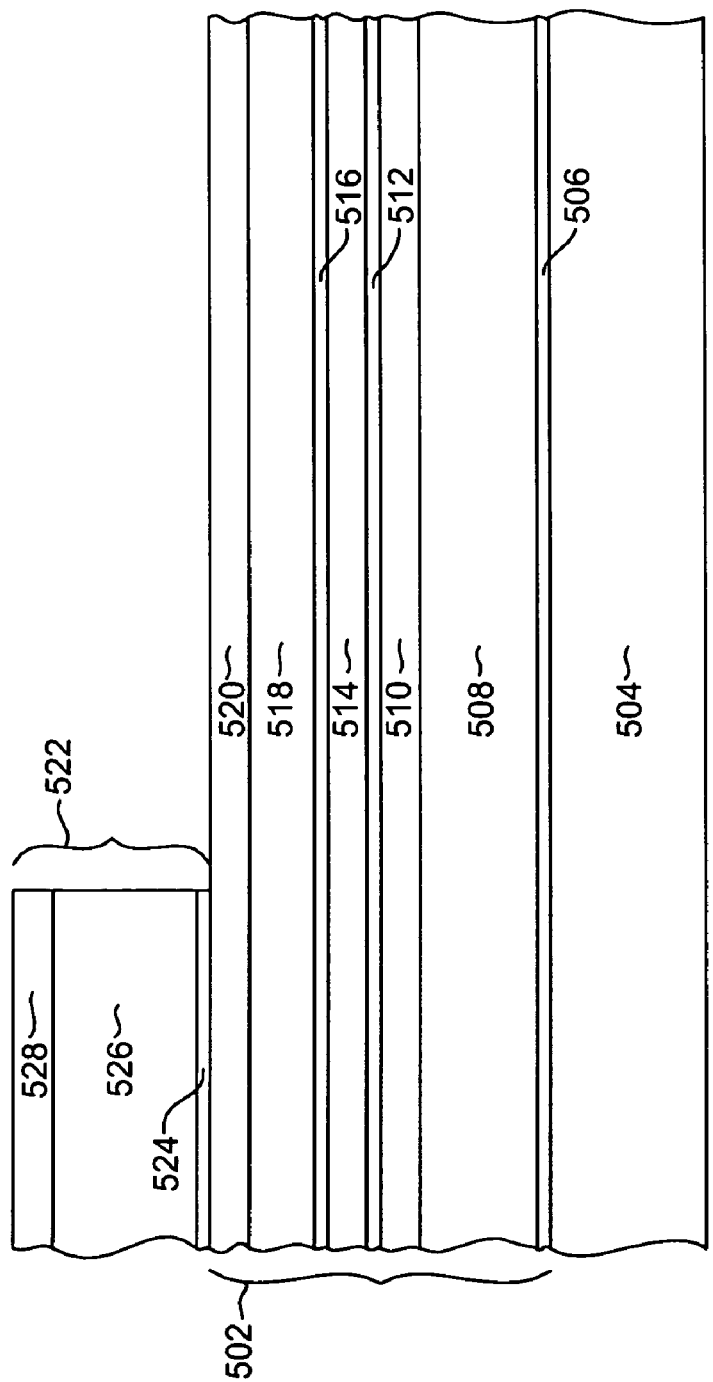
FIGS. 5-11 are cross sectional views of a magnetoresistive sensor in various intermediate stages of manufacture, illustrate a method of manufacturing a magnetoresistive sensor according to an embodiment of the invention.

With reference now to FIGS. 5-11, a method for constructing a CPP magnetoresistive sensor according to an embodiment of the invention is described. With particular reference to FIG. 5, a series of sensor layers 502 are deposited over a substrate 504, such a first shield layer. The sensor layers can include: a seed layer 506, an AFM layer 508, AP1 layer 510, coupling layer 512, AP2 layer 514, spacer or barrier layer 516, a magnetic free layer 518, and a capping layer 520. The capping layer 520 can be constructed of, for example Ta, or some other electrically conductive, non-magnetic material.

With continued reference to FIG. 5, a mask structure 522 is constructed over the sensor layers 502. The mask may be of various types, and may include a hard mask 524 such as alumina, silicon dioxide, diamond like carbon (DLC), etc. The mask 522 may also include an image transfer layer 526 formed over the hard mask and a photosensitive layer 528 formed over the image transfer layer 526. The image transfer layer 526 can be a soluble polyimide material such as DURIMIDE® or some similar material. The photosensitive material 528 can be a material such as photoresist.

Figure 6:
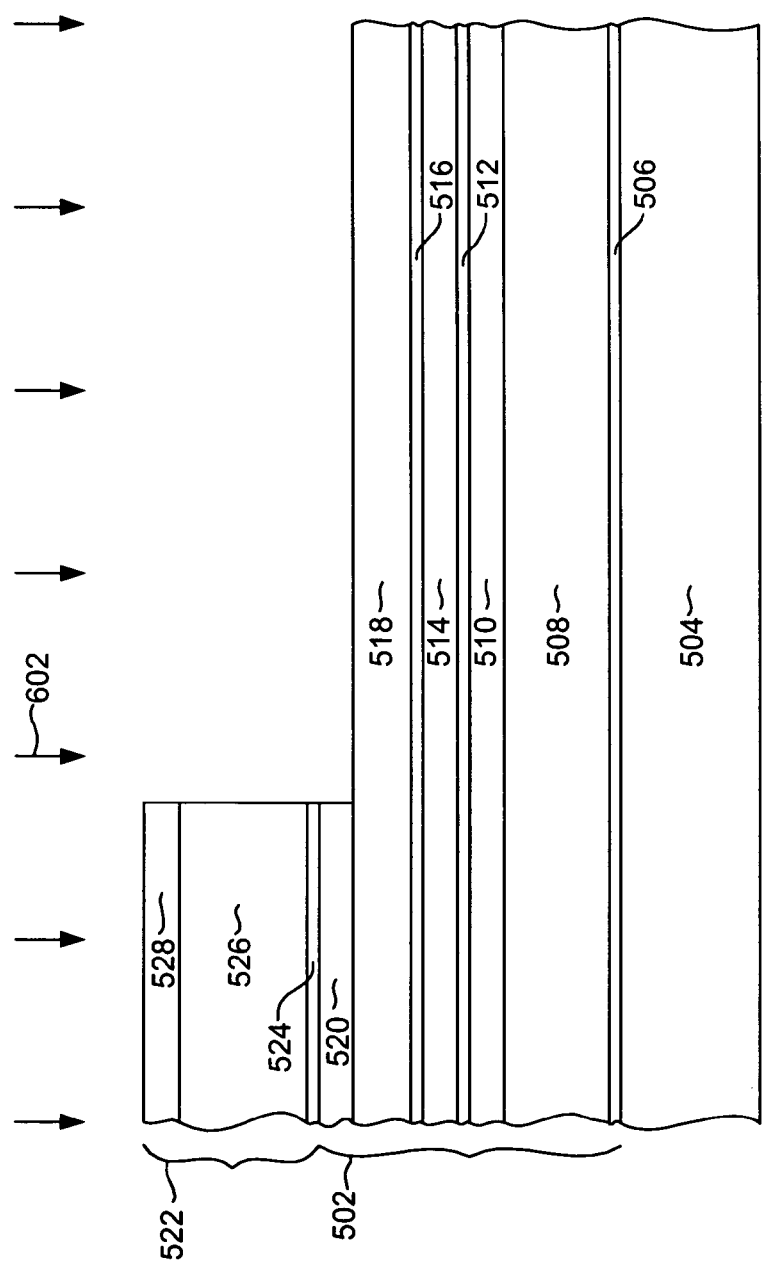
Figure 7:
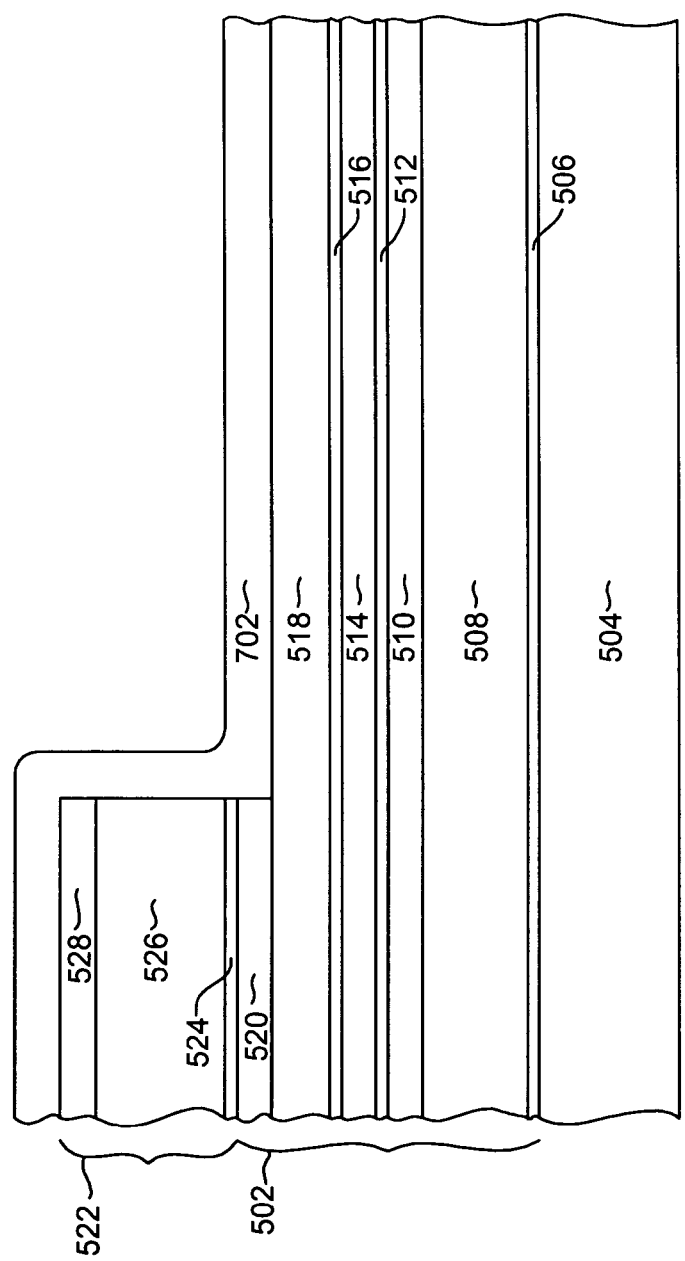

With reference now to FIG. 6, a reactive ion etch (RIE) is performed just sufficiently to remove the capping layer 520, but not long enough to remove the free layer 518. Then, with reference to FIG. 7, a layer of magnetic material 702 such as NiFe CoFe or any suitable magnetic material is deposited. The magnetic material 702 can be deposited by sputter deposition in a sputtering chamber.

Figure 8:
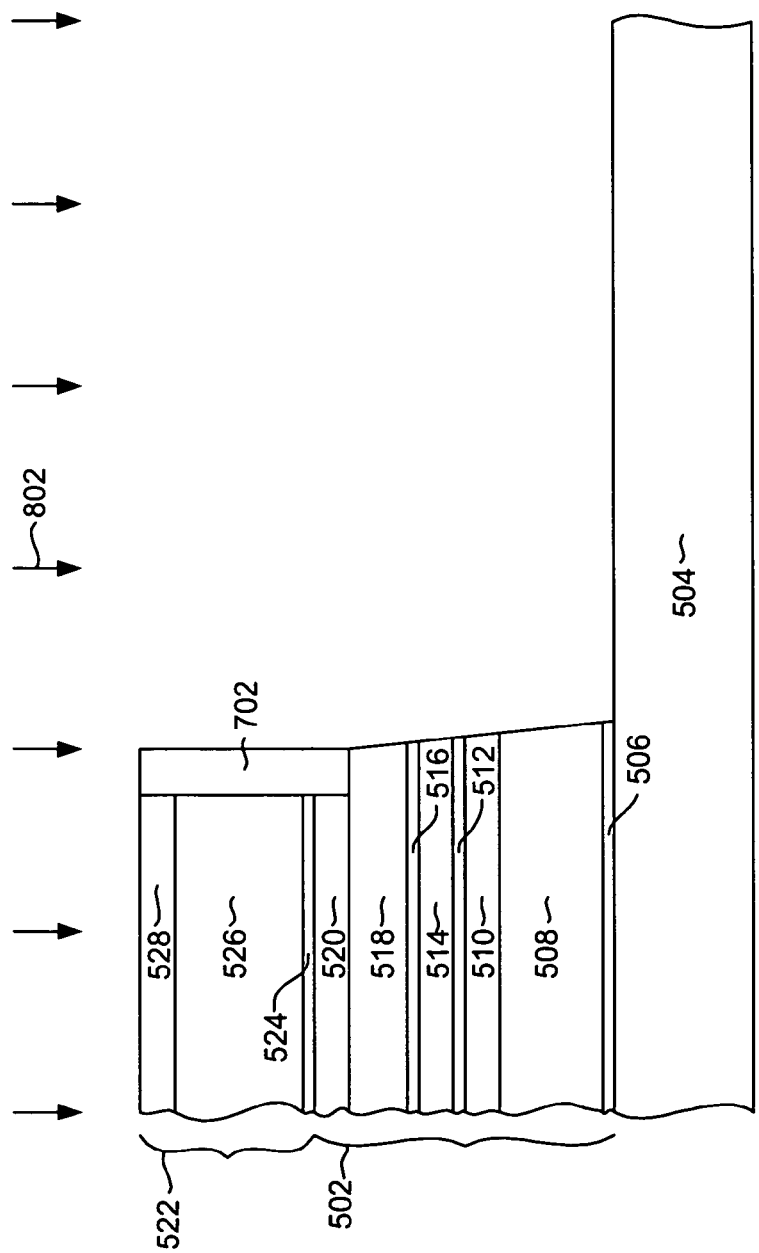

With reference to FIG. 8, an ion mill 802 is performed to remove portions of the sensor layers 502 that are not protected by the mask 522 and magnetic layer 702. As can be seen in FIG. 8, the ion mill 802 removes the horizontally disposed portions of the magnetic layer leaving a vertical wall of the magnetic layer 702.

Figure 9:
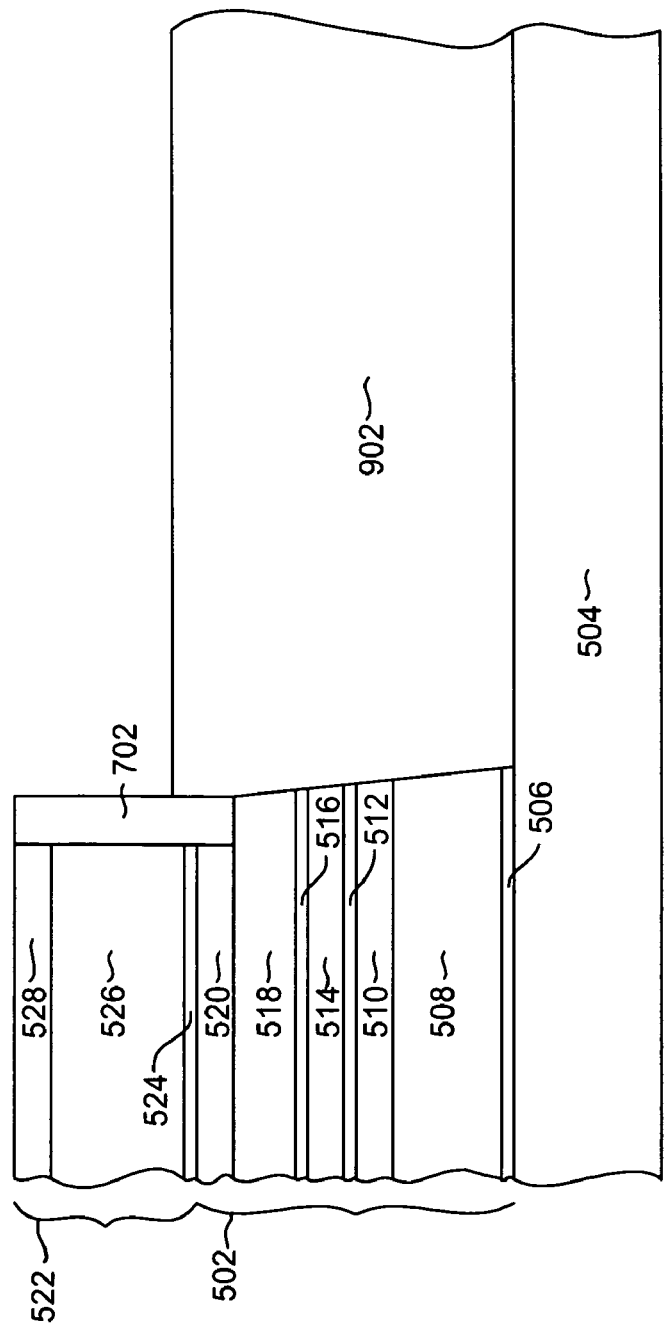

With reference to FIG. 9, a layer of non-magnetic, electrically insulating fill material 902 is deposited. The insulating fill material 902 could be of various materials, but is preferably constructed of alumina. The fill layer 902 can be deposited by sputter deposition, and is preferably deposited to a level at least as high as the top of the capping layer 520.

Figure 10:
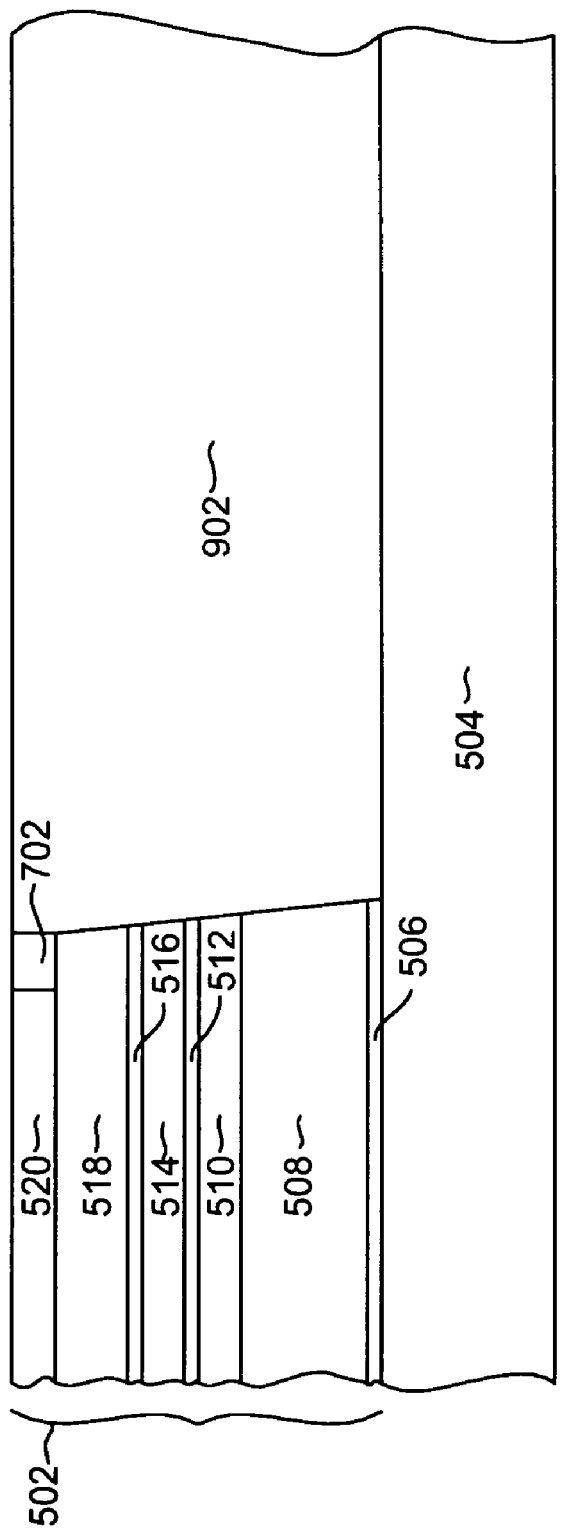
Figure 11:
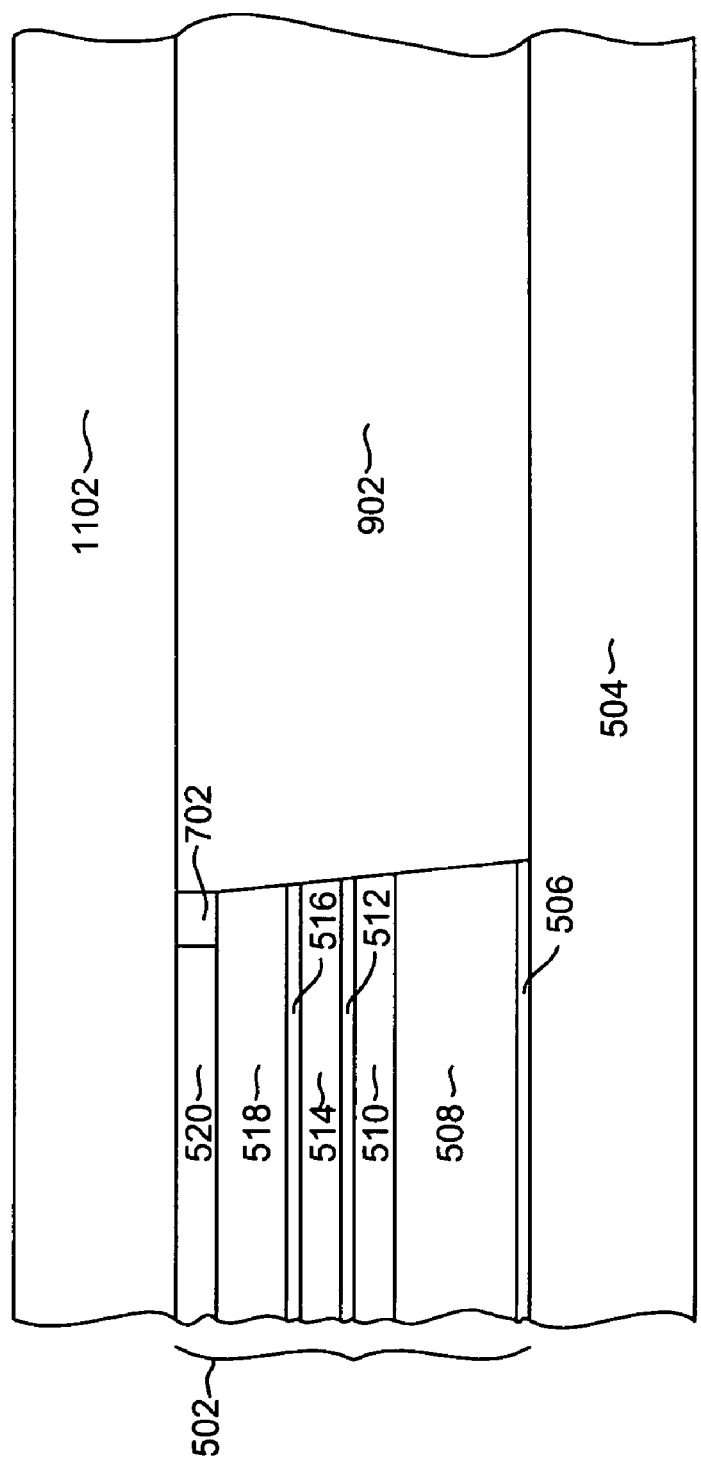

With reference to FIG. 10, a chemical mechanical polish (CMP) can be performed to form smooth, coplanar surfaces across the fill layer 902, magnetic layer 702 and capping layer 520. Then, with reference to FIG. 11 an electrically conductive, magnetic shield layer 1102 is deposited to form the second shield 306 described with reference to FIG. 3.

Figure 12:
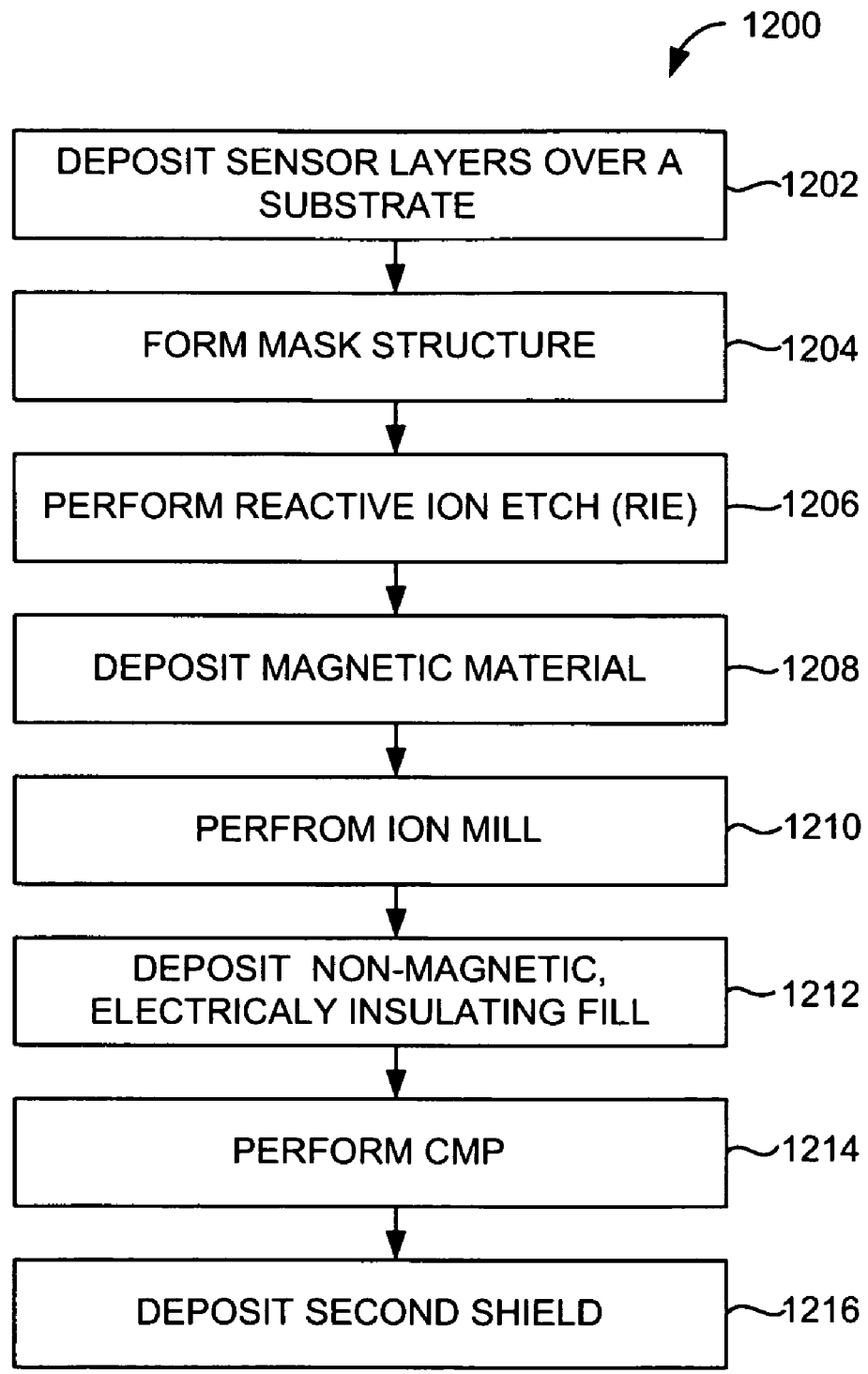
FIG. 12 is a flow chart summarizing a method of manufacturing a magnetoresistive sensor according to an embodiment of the invention.

With reference to FIG. 12, a method 1200 for constructing a CPP magnetoresistive sensor according to an embodiment of the invention is summarized. In a step 1202, plurality of sensor layers are deposited over a substrate such as a magnetic, electrically conductive first shield layer. The sensor layers include a non-magnetic, electrically conductive capping layer at the top. The capping layer can be, for example Ta. Then, in a step 1204 a mask structure is formed over the deposited sensor layers. In a step 1206 reactive ion etch is performed sufficiently to remove portions of the cap layer that are not covered by the mask structure. Then, in a step 1208 a magnetic material is deposited. The magnetic material, which can be NiFe, CoFe or some other material, is preferably deposited by a sputter deposition in a sputter deposition chamber. Then, in a step 1210 an ion mill is performed to define the sensor stripe height by removing portions of the sensor layers that are not covered by the mask structure or the remaining magnetic layer. In a step 1212 a fill layer is deposited. Then, in a step 1214 a chemical mechanical polishing process (CMP) is performed to planarize the fill layer, magnetic layer and top of the sensor layers. Finally, in a step 1216 a magnetic electrically conductive material such as NiFe is deposited to form the second shield.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A current perpendicular to plane (CPP) magnetoresistive sensor, comprising:
   a sensor stack having an air bearing surface (ABS), a back edge opposite the ABS, and a top;
   a non-magnetic capping layer formed at the top of the sensor stack, the capping layer extending from the ABS to a termination point located at a location between the ABS and the back edge of the sensor stack; and
   a magnetic coupling layer extending from the termination of the capping layer to the back edge of the sensor stack; and wherein
   the non-magnetic capping layer and the magnetic coupling layer each have a bottom surface that contacts the top of the sensor stack, the bottom surfaces of the non-magnetic capping layer and the magnetic coupling layer each being coplanar with one another.

2. A sensor as in claim 1 further comprising an electrically conductive, magnetic shield formed over the capping layer and the magnetic coupling layer.

3. A sensor as in claim 1 wherein the magnetic coupling layer comprises NiFe.

4. A sensor as in claim 1 wherein the capping layer comprises Ta and the magnetic coupling layer comprises NiFe.

5. A sensor as in claim 1 further comprising a magnetic free layer, the magnetic coupling layer being disposed between and magnetically connecting the free layer and the shield.

6. A current perpendicular to plane (CPP) magnetoresistive sensor, comprising:
   a magnetic free layer;
   a magnetic pinned layer;
   a non-magnetic, electrically conductive spacer layer sandwiched between the free layer and the pinned layer; and
   first and second, electrically conductive, magnetic shields, the free layer, pinned layer and spacer layer being disposed between the first and second magnetic shields; and wherein;
   a portion of the free layer is magnetically coupled to the second shield by a magnetic coupling layer that is physically connected with both the free layer and the second shield.

7. A sensor as in claim 6 wherein the free layer has an end disposed near an air bearing surface (ABS end) and a back end opposite the ABS end, and wherein the free layer is coupled to the second shield near the back end.

8. A current perpendicular to plane (CPP) magnetoresistive sensor, comprising:
   a magnetic free layer;
   a magnetic pinned layer;
   a non-magnetic, electrically insulating barrier layer sandwiched between the free layer and the pinned layer; and
   first and second conductive, magnetic shields, the free layer, pinned layer and spacer layer being disposed between the first and second magnetic shields; and wherein;
   a portion of the free layer is magnetically coupled to the second shield shield by a magnetic coupling layer that is physically connected with both the free layer and the second shield.

9. A sensor as in claim 8 wherein the free layer has an end disposed near an air bearing surface (ABS end) and a back end opposite the ABS end, and wherein the free layer is coupled to the second shield near the back end.

10. A current perpendicular to plane (CPP) magnetoresistive sensor, comprising:
    a magnetic pinned layer structure;
    a magnetic free layer;
    a non-magnetic, electrically conductive spacer layer sandwiched between the free layer and the pinned layer structure;
    an electrically conductive magnetic shield;
    a non-magnetic, electrically conductive capping layer disposed between the free layer and the shield; and
    a magnetic coupling layer, magnetically connecting a portion of the free layer with the shield, the magnetic coupling layer physically contacting the free layer and the shield.

11. A sensor as in claim 10 wherein the free layer has an end disposed near an air bearing surface (ABS end) and a back end opposite the ABS end, and wherein the magnetic coupling layer is disposed near the back end of the free layer.

12. A sensor as in claim 10 wherein:
    the free layer has an end disposed near an air bearing surface (ABS end) and a back end opposite the ABS end;
    the non-magnetic capping layer extends from the ABS toward the back end, the capping layer terminating at a point between the ABS end and the back end; and
    the magnetic coupling layer extends from the termination of the capping layer to the back end of the free layer.

13. A sensor as in claim 10 wherein:
    the free layer has an end disposed near an air bearing surface (ABS end) and a back end opposite the ABS end;
    the non-magnetic capping layer extends from the ABS toward the back end at least ¾ the distance from the ABS to the back end, the capping layer terminating short of the back end; and
    the magnetic coupling layer extends from the termination of the capping layer to the back end of the free layer.

14. A sensor as in claim 13 wherein the non-magnetic capping layer comprises Ta.

15. A current perpendicular to plane (CPP) magnetoresistive sensor, comprising:
    a magnetic pinned layer structure;
    a magnetic free layer;
    a non-magnetic, electrically insulating barrier layer sandwiched between the free layer and the pinned layer structure;
    an electrically conductive, magnetic shield;
    a non-magnetic, electrically conductive capping layer disposed between and physically contacting the free layer and the shield: and
    a magnetic coupling layer, magnetically connecting a portion of the free layer with the shield.

16. A sensor as in claim 15 wherein the free layer has an end disposed near an air bearing surface (ABS end) and a back end opposite the ABS end, and wherein the magnetic coupling layer is disposed near the back end of the free layer.

17. A sensor as in claim 15 wherein:
    the free layer has an end disposed near and air hearing surface (ABS end) and a back end opposite the ABS end;
    the non-magnetic capping layer extends from the ABS toward the back end, the capping layer terminating at a point between the ABS end and the back end; and
    the magnetic coupling layer extends from the termination of the capping layer to the back end of the free layer.

18. A sensor as in claim 15 wherein:
    the free layer has an end disposed near and air bearing surface (ABS end) and a back end opposite the ABS end;

the non-magnetic capping layer extends from the ABS toward the back end at least ¾ the distance from the ABS to the back end, the capping layer terminating short of the back end;and the magnetic coupling layer extends from the termination of the capping layer to the back end of the free layer.

19. A sensor as in claim 15 wherein the non-magnetic capping layer comprises Ta.

20. A sensor as in claim 10 wherein the free layer has a top surface, and wherein the capping layer and magnetic coupling layer are formed on the top surface of the free layer.

21. A sensor as in claim 15 wherein the free layer has a top surface, and wherein the capping layer and magnetic coupling layer are formed on the top surface of the free layer.

22. A sensor as in claim 10 wherein the non-magnetic, electrically conductive capping layer and the magnetic coupling layer each have top surfaces that are coplanar with one another and each have bottom surfaces that are coplanar with one another.

23. A sensor as in claim 15 wherein the non-magnetic, electrically conductive capping layer and the magnetic coupling layer each have top surfaces that are coplanar with one another and each have bottom surfaces that are coplanar with one another.

* * * * *